United States Patent [19]
Ueda et al.

[11] Patent Number: 5,598,236
[45] Date of Patent: Jan. 28, 1997

[54] CAMERA USING A FILM HAVING A MAGNETIC RECORDING PORTION

[75] Inventors: Toshiharu Ueda, Yokohama; Akira Egawa, Kawasaki, both of Japan

[73] Assignee: Canon Kabushiki Kaisha, Tokyo, Japan

[21] Appl. No.: 580,274

[22] Filed: Dec. 27, 1995

Related U.S. Application Data

[63] Continuation of Ser. No. 288,263, Aug. 11, 1994, abandoned, which is a continuation of Ser. No. 890,405, May 29, 1992, abandoned.

[30]    Foreign Application Priority Data

| May 30, 1991 | [JP] | Japan | 3-153743 |
| Jun. 12, 1991 | [JP] | Japan | 3-166221 |
| Jun. 12, 1991 | [JP] | Japan | 3-166222 |
| Jun. 12, 1991 | [JP] | Japan | 3-166223 |

[51] Int. Cl.⁶ .......................... G03B 7/00; G03B 17/24; G03B 17/26
[52] U.S. Cl. .................... 396/319; 396/515; 396/390
[58] Field of Search ............. 354/21, 105, 106, 354/275

[56]    References Cited

U.S. PATENT DOCUMENTS

| 4,864,332 | 9/1989 | Harvey | 354/21 |
| 4,878,075 | 10/1989 | Cannon | 354/173.1 |
| 4,965,600 | 10/1990 | Smart et al. | 354/212 |
| 4,994,833 | 2/1991 | Cocca | 354/207 |
| 5,006,873 | 4/1991 | Wash | 354/106 |
| 5,130,728 | 7/1992 | Goto et al. | 354/105 |
| 5,138,350 | 8/1992 | Cocca | 354/21 |
| 5,220,367 | 6/1993 | Matsuyama | 354/105 |
| 5,281,987 | 1/1994 | Nagata | 354/105 |

FOREIGN PATENT DOCUMENTS

55-22799  2/1980  Japan.

*Primary Examiner*—Safet Metjahic
*Assistant Examiner*—Eddie C. Lee
*Attorney, Agent, or Firm*—Fitzpatrick, Cella, Harper & Scinto

[57]    ABSTRACT

In a camera, whether a film has been partially exposed or not is checked, and if the check fails, a use status on a film cartridge is rotated to an optimum position such as a position indicating an exposed status. Thus, double exposure of the film is prevented.

12 Claims, 10 Drawing Sheets

CAMERA USING A FILM HAVING A MAGNETIC RECORDING PORTION

This application is a continuation of prior application, application Ser No. 08/288,263, filed Aug. 11, 1994, which is a continuation of prior application, application Ser. No. 07/890,405, filed May 29, 1992, both now abandoned.

BACKGROUND OF THE INVENTION

1. Field of the Invention

The present invention relates to a camera to which a film having a magnetic recording portion for reading and/or writing film information or photographing information is loaded.

2. Related Background Art

Japanese Laid-Open Patent Application No. 55-22799 discloses a camera which records information relating to a film as magnetic information on a separate member from the film which in fed integrally with the film, and reads the magnetic information is association with the feed of the film. U.S. Pat. No. 4,878,075 discloses a method in which a film is regarded to have been exposed when film information is updated. U.S. Pat. No. 4,965,600 discloses a cartridge which indicates unuse, under use or used status. U.S. Pat. No. 4,864,332 discloses a technique for recording and reproducing film information and photographing information of a camera by providing a magnetic recording area on the film.

In a camera which uses such a film, an indication (hereinafter referred to as a VEI indication) on the cartridge and a basic pattern of the magnetic information are compared to detect exposure information so that even if the film under use is rewound into the cartridge, the cartridge is unloaded and then the cartridge is reloaded into the camera, an unexposed area of the film can be exactly set to permit photographing without double exposure.

However, in the prior art, when the film use status indication means indicates that the film is in use, the camera reads the information on the magnetic recording area of the film by a magnetic head to search an unexposed frame, but if the information on the magnetic recording area cannot be read because of trouble of the camera, double exposure takes place.

SUMMARY OF THE INVENTION

It is an object of the present invention to provide a camera which does not cause double exposure even if the magnetic information cannot be read.

Other objects of the present invention will be apparent from the following detailed description of the invention.

In one embodiment of the present invention, a camera to which a film having a magnetic recording portion and a film cartridge having film use status indication means are to be loaded comprises means for storing a content of the use status indication of the film when the film is loaded, detection means for detecting an error by checking whether recorded information in the magnetic recording area of the loaded film is read or not, and control means for matching the content of the film use status indication means to the stored content of the film use status indication in accordance with the error detection by the detection means.

DETAILED DESCRIPTION OF THE PREFERRED EMBODIMENTS

Figure 1:
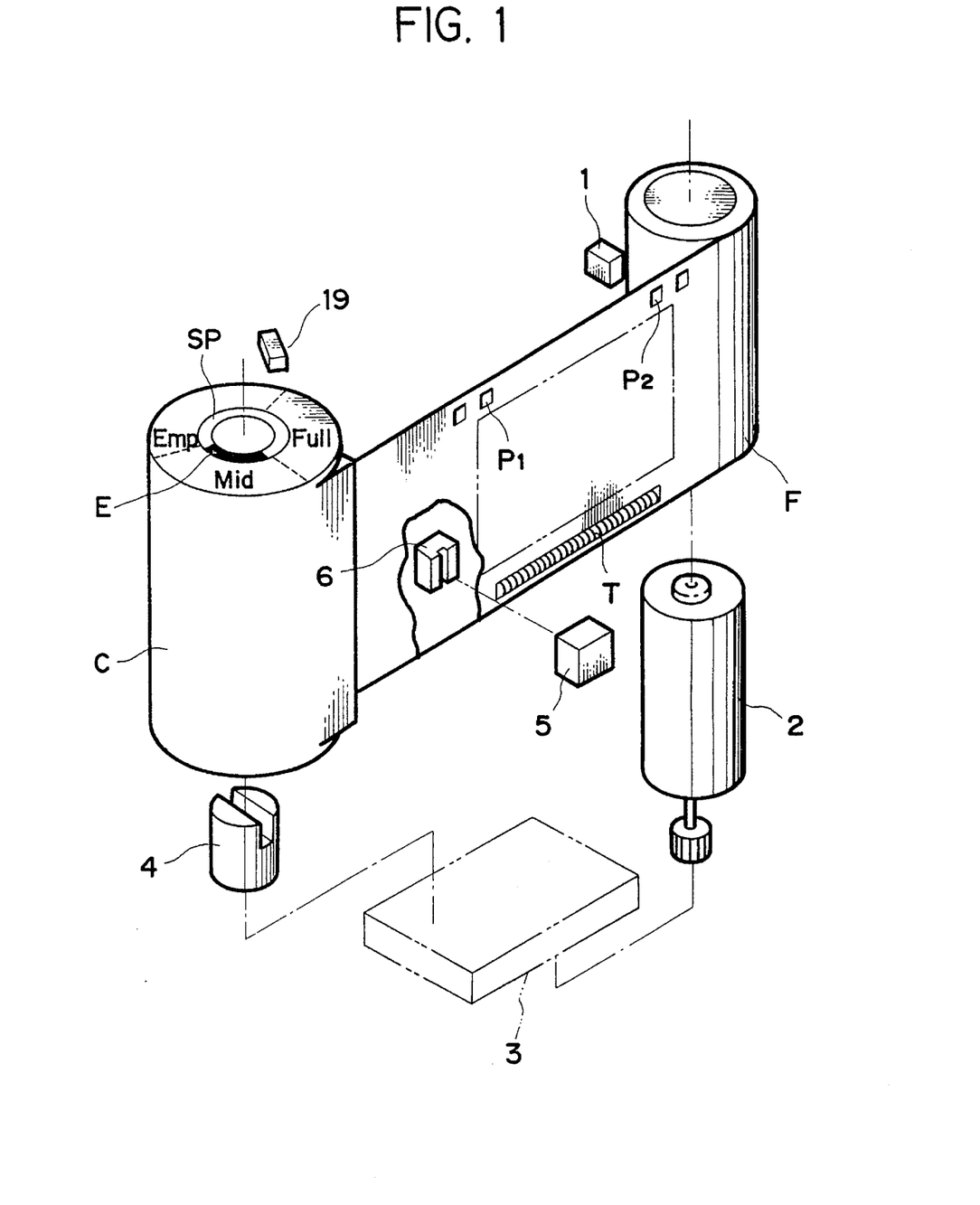
FIG. 1 shows a developed perspective view of an internal structure of a mechanical unit of a camera of the present invention.
Figure 2:
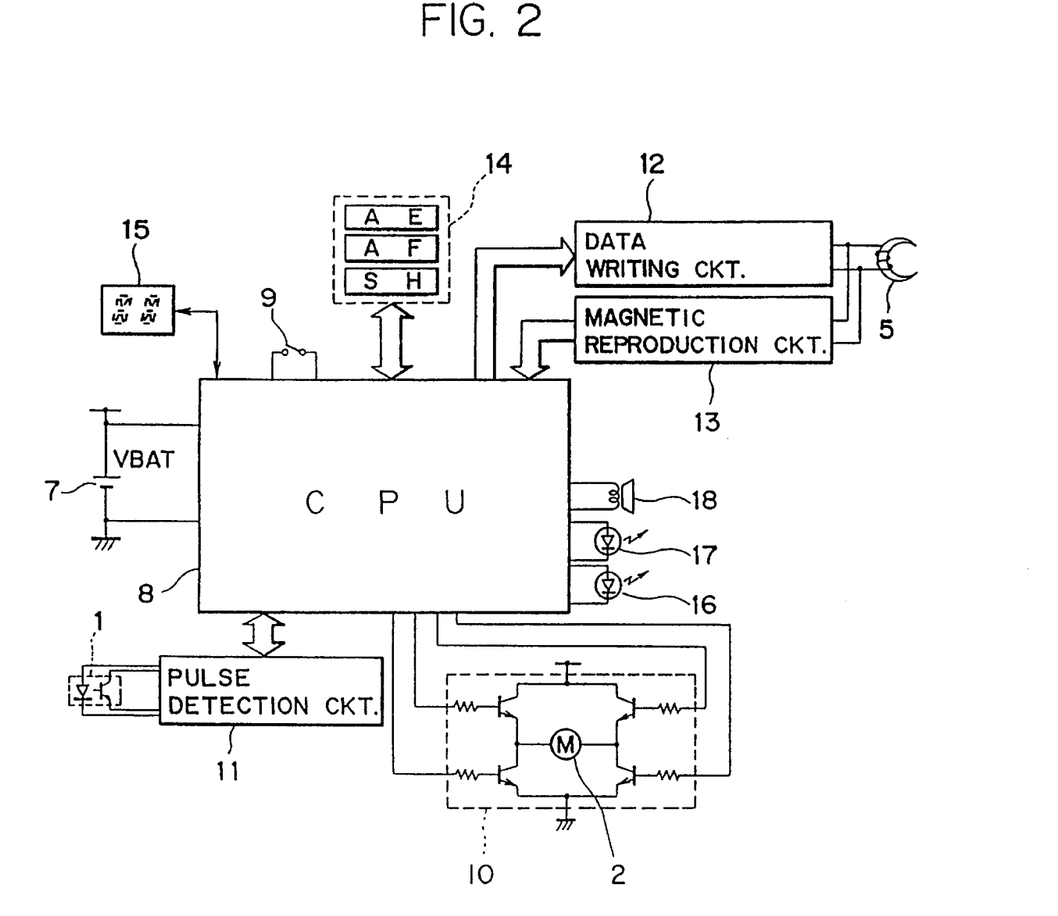
FIG. 2 shows a block diagram of an overall electrical circuit of the camera of the present invention.

FIG. 1 shows a developed perspective view of a schematic internal structure of the camera of the present invention, and FIG. 2 shows a block diagram of an overall electrical circuit of the present invention.

In FIG. 1, numeral 1 denotes a feeding photo-reflector which detects perforations P1 and P2 of a film F to feed the film by a predetermined length, numeral 2 denotes a film feed motor arranged in a spool, numeral 3 denotes a gear mechanism for reducing speed and switching between take-up and rewind, numeral 4 denotes a rewind fork, numeral 5 denotes a magnetic head for writing and reading information to and from a track T on the film F, and numeral 6 denotes a pressure pad for pressing the film F to the magnetic head S.

The film F is accommodated in the film cartridge C in a wound state. The film F has a magnetic layer applied on a base thereof, and has a track T on one edge thereof for recording data such as an exposure status and a frame number as magnetic information and perforations P1 and P2 representing a photographing frame on the other edge.

A film use status indication E for indicating the film use status by a relative position to the film cartridge C is provided on an end surface of the film spool SP and on the top side of the film cartridge C. In order to detect the film use status indication E which represents an unused, exposed or partially exposed status of the film, a photo-reflector 19 is arranged above the film cartridge C. When the indication E indicates "Mid" on the cartridge C as shown in FIG. 1, it indicates that the film has been partially exposed, when the indication is Full, it represents that all frames of the film have been exposed, and when the indication is Emp, it represents that all frames of the film have not been exposed (that is, the film is unused).

A configuration of FIG. 2 is now explained.

Numeral 8 denotes a CPU (microcomputer) which drives and controls the entire system, and power therefor is supplied from a battery 7. In addition to the battery 7, connected to the CPU 8 are a release switch 9 which is turned on when photographing is to be started, a feed circuit 10 for taking up and rewinding the film F, a pulse detector 11 for converting a signal detected by the feeding photo-reflector 1 to a signal acceptable by the CPU 8, a magnetic information write circuit 12 for sending a signal to record photographing information onto the track T of the film F by the magnetic head 5, a magnetic read circuit 13 for reading the magnetic information written on the track T of the film F, an AE/AF/SH circuit for effecting auto-exposure, auto-focusing and shutter release, an LCD (Liquid Crystal Display) 15 for displaying a frame number of the film F as well as an error warning, LED's (Light Emitting Diodes) 16 and 17 which flicker to give error warning and a buzzer 18 for generating a sound for error warning.

FIGS. 3 to 7 show flow charts of operations in the embodiment of the present invention. In the drawings, S stands for a step.

Figure 3:
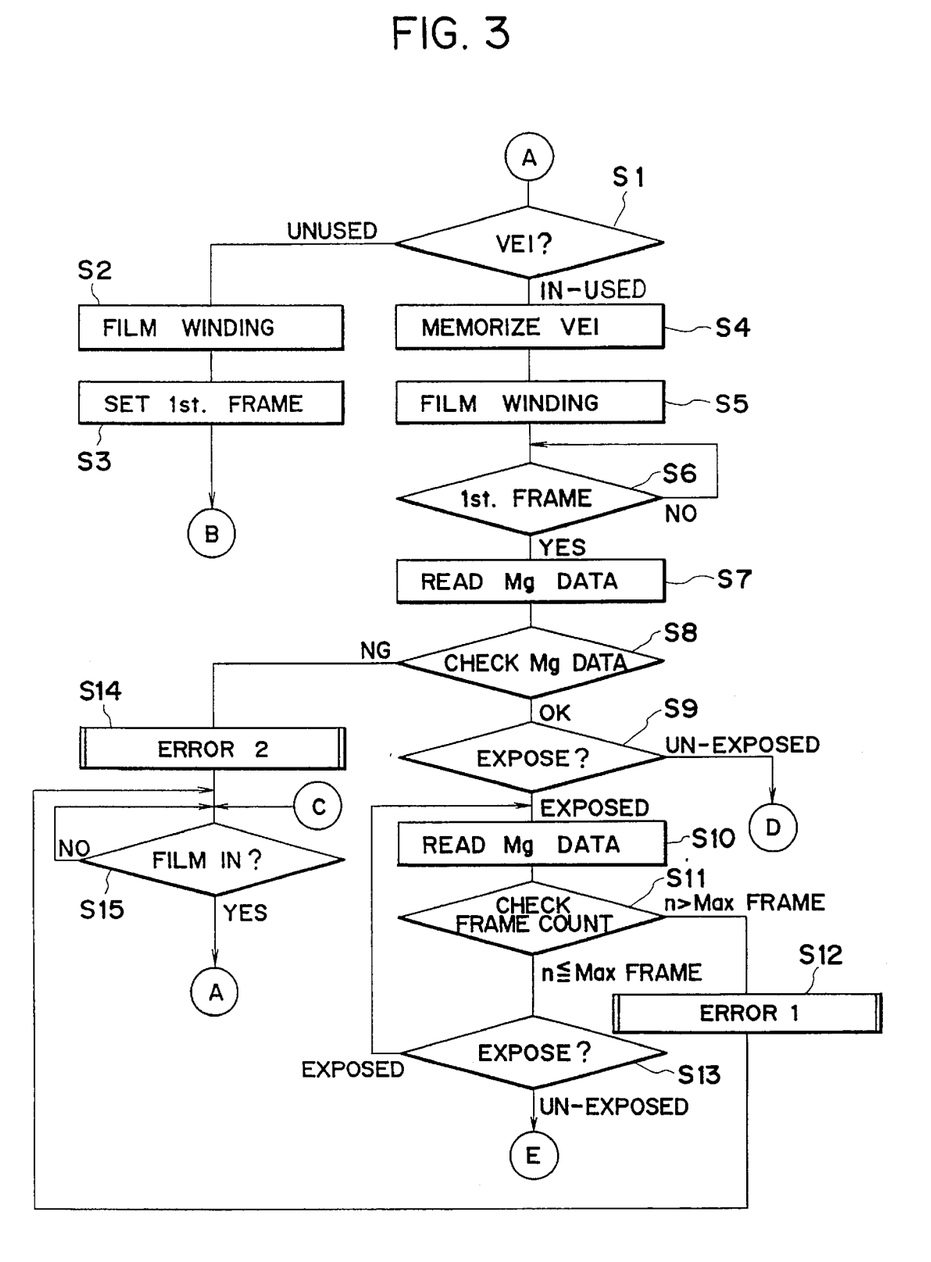
FIG. 3 shows a flow chart of an operation in an embodiment of the present invention.

The film use status indication E is first detected (VEI check) (S1). If unuse is detected, winding up to the first frame is started (S2), and when the first frame is reached (S3), a process of FIG. 5 is started. On the other hand, when in-use of the film (partially exposed) is detected, the film use status detected by the photo-reflector 19 and a detector (not shown) is stored in a memory area in the CPU 8 (S4). The film is further taken up (S5) and whether a new frame after the take-up is the first frame or not is checked (S6). If it is the first frame, the magnetic information of the first frame is read into the CPU 8 (S7). Then, whether the read magnetic information can be read as data or not is checked (S8), and if it cannot be read, an error process 2 (S14) is executed, and if it can be read, the exposure status of the first frame is checked by the magnetic information (S9). If the film is unused at the initial state, the process goes to a flow D of FIG. 4.

In the exposure check, the exposure status is determined depending on whether the magnetic information is at the initial state or not. If it is not at the initial state, it is regarded as the exposed status and the magnetic information of the second frame and the subsequent frames is read into the CPU 8 (S10), and whether it is the frame number within the range permitted for photographing or not is determined (S11). Whether the film has been exposed or not is determined by the exposure data (S13). If an unexposed frame is detected within the frames permitted for photographing, the process proceeds to a flow E of FIG. 4. If an unexposed frame is not detected within the frames permitted for photographing, an error process 1 is executed (S12). In this process, an error in the film cartridge C or the film F is handled because the magnetic information indicates that all frames have been exposed in spite of the fact that the film use status indication E indicates the in-use and a normal operation of the magnetic circuit has been checked in the step S8. In the check of the magnetic information in the step S8, if the data cannot be read, an error process 2 is executed (S14) to check a magnetic error because there is a possibility of an error in the magnetic circuit, and then a position of a film load/unload switch (not shown) is checked (S15), and if the film has been loaded, the process proceeds to a flow A of the step S1 of FIG. 3.

Figure 4:
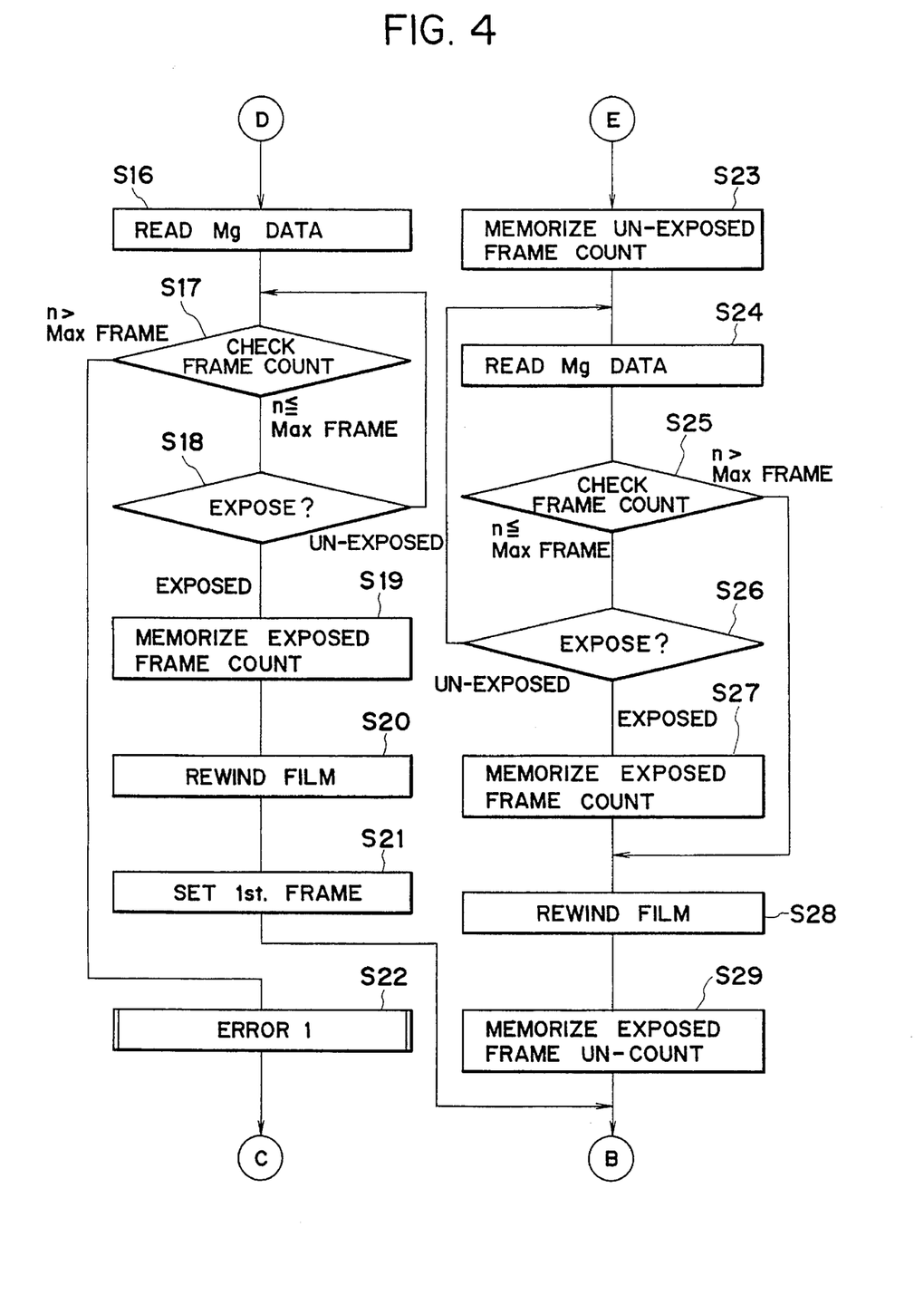
FIG. 4 shows a flow chart of flows D and E following FIG. 3.
Figure 5:
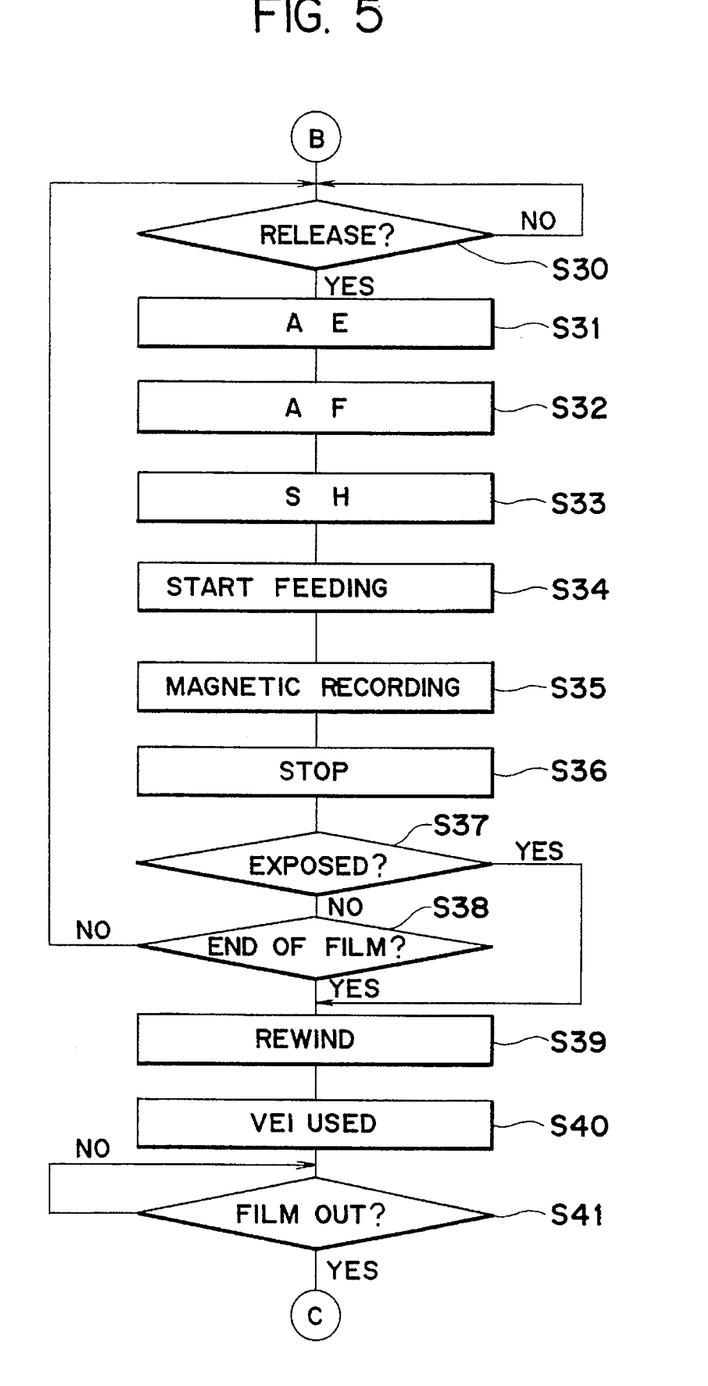
FIG. 5 shows a flow chart of a flow B following FIGS. 3 and 4.

A process of FIG. 4 is now explained.

In order to check if there is an exposed frame in or after the second frame, the magnetic information is read into the CPU 8 (S16) to determine if it is a frame within a range permitted for photographing (S17), and whether it is an unexposed frame or not is determined by the exposure data (S18). If an exposed frame is detected in the range permitted for photographing, the frame number at which the exposed frame starts is stored (S19) to use it as double exposure prevention data. Then, the film is rewound until the first frame is reached (S20), a frame ready for photographing is set (S21), and the process proceeds to a flow B of FIG. 5. On the other hand, if n>max frame is detected in the step S17, the magnetic information indicates that none of the frames has been exposed in spite of the fact that the film use status indication E indicates the in-use, and unexposure information is detected. Since the initial magnetic information state has been normally detected by the magnetic circuit, it is regarded as an error in the cartridge C or the film F and the error process 1 is executed (S22). Then, the process proceeds to a flow C of the step S15 of FIG. 3.

On the other hand, in the flow E, the frame number at which the unexposed frame starts is stored (S23), and it is used as unexposed frame data. Then, the magnetic information is read into the CPU 8 (S24) in order to check whether there is an exposed frame after the frame stored in the step S23 (S24), whether it is a frame within the range permitted for photographing or not is checked (S25), and whether it is an unexposed frame or not is checked by the exposure data (S26). If an exposed frame is detected in the frames permitted for photographing, the frame number is stored (S27) for use as double exposure prevention data. If it is determined in the steps S25 and S26 that there is no exposed frame in the frames permitted for photographing, the film is rewound until the first unexposed frame stored in the step S23 is reached (S28), the frames permitted for photographing are set (S29), and the process proceeds to the flow B of FIG. 5.

A process of FIG. 5 is now explained.

An ON/OFF state of the release switch 9 is detected (S30). If it is ON, an AE (auto-exposure) process (S31), an AF (auto-focusing) process (S32) and an SH (shutter release) process (S33) are sequentially executed to photometer and measure distance for photographing. Then, the feed motor 2 is driven to start the take-up of the film F (S34). The data at the time of photographing is recorded on the track T by the magnetic head 5 and the magnetic information write circuit 12 (S35). When the perforations P1 and P2 are detected by the photo-reflector 1 as a one-frame signal, the feed motor 2 is stopped (S36) to terminate the take-up.

Then, whether there is an exposed frame stored in the step S19 or S27 or not is determined (S37), and if there is one, the film is rewound (S39), and if there is no exposed frame, whether the last frame of the film F is reached or not is detected by a last frame detecting perforation (not shown). If the last frame has not been reached, the process proceeds to a step S30, and if the last frame is reached, the film F is rewound (S39). When the rewinding is completed, the film use status E is changed to "used" (S40). Then, the load/unload of the film is detected by the film load/unload switch (not shown) (S41), and if it has been unloaded, the process proceeds to a flow C of FIG. 3.

Figure 6:
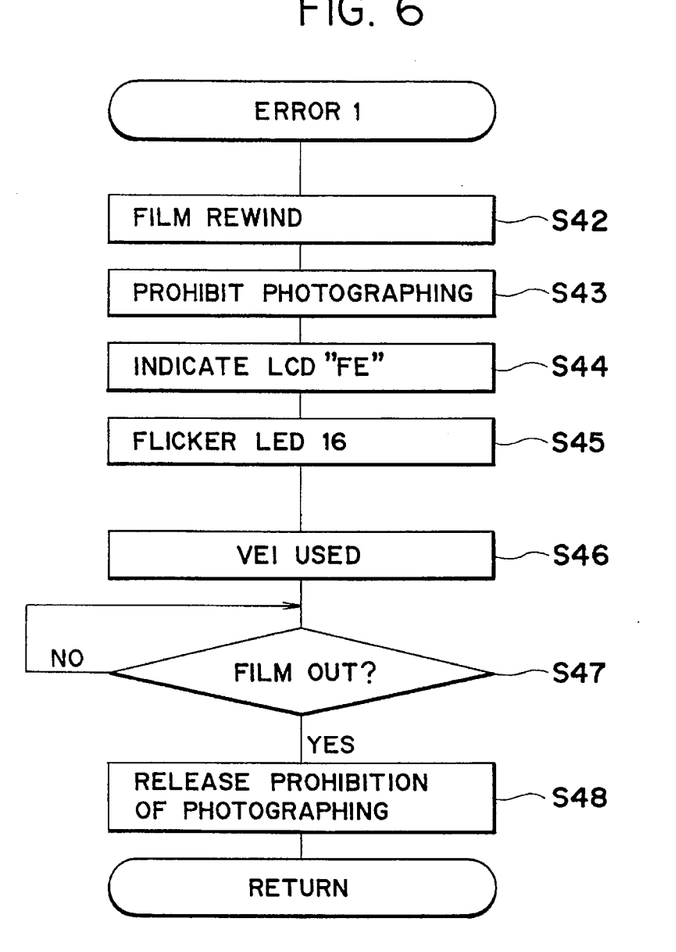
FIG. 6 shows a flow chart of details of an error process 1 shown FIGS. 3 and 4.
Figure 7:
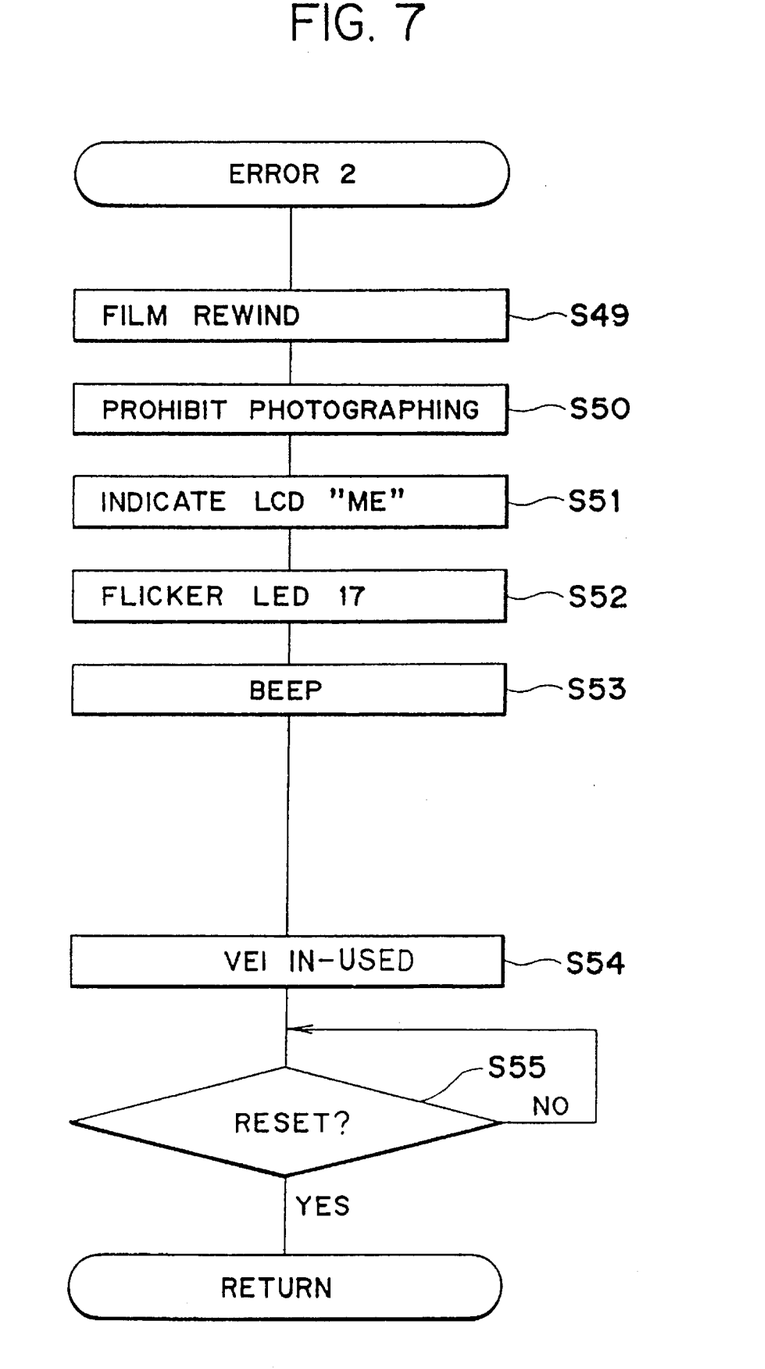
FIG. 7 shows a flow chart of details of an error process 2 shown in FIG. 3.

FIGS. 6 and 7 show flow charts of details of the error processes 1 and 2 shown in FIGS. 3 and 4.

The error process 1 is first explained. The film is rewound so that it is not exposed (S42) and a photographing inhibit state is set not to accept the output from the switch 9 (S43). An LCD display indicating a film error (for example, FE) is displayed (S44) and the LED 16 is flashed (S45). Then, the film use status display mark E is changed to "used" (S46), the load/unload of the film is detected by the position of the film load/unload switch (S47), and if the film has been unloaded, the photographing inhibit state set in the step S43 is released (S48).

The error process 2 is now explained. As in the error process 1, the film F is rewound (S49) and the photographing inhibit state is set (S50). Then, the LCD display indicating an error in the magnetic circuit (for example, ME) is displayed (S51), the LED 17 is flashed (S52) and an alarm sound is generated by the buzzer 18 (S53). Then, the fork 4 is rotated by the motor 2 to change the film use status E on the film cartridge C to "in-use" (S54). When the removal of the drive battery 7 is detected, the system is reset (S55).

Figure 8:
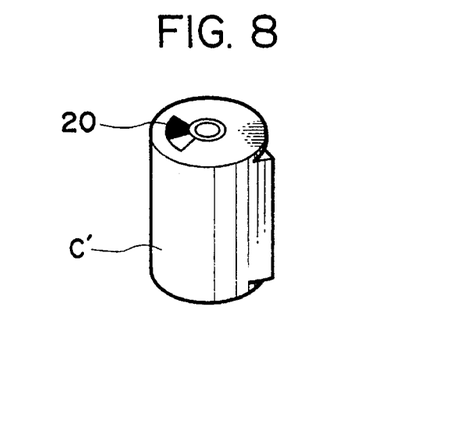
FIG. 8 shows a perspective view of another example for indicating a film use status.

FIG. 8 shows a perspective view of another example of the film use status display.

Numeral 20 denotes film use status display means by which a block area is circumferentially moved in accordance with the amount of the film F used so that unuse, in-use and used status can be indicated by the position of the black area.

Another embodiment of the present invention is now explained. Since the second embodiment is substantially identical to the first embodiment, only the differences are explained in detail.

Figure 9:
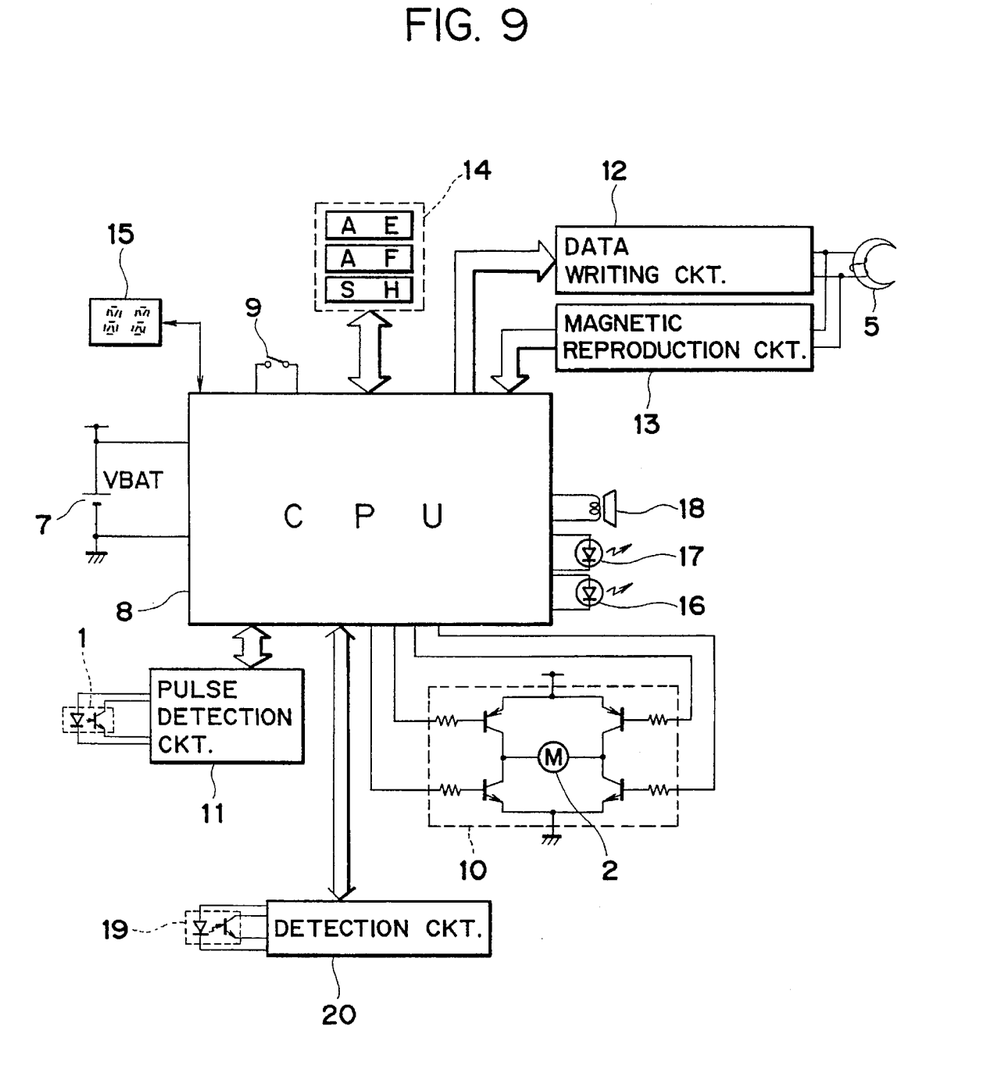
FIG. 9 shows a block diagram of an overall electrical circuit of a second embodiment of the camera of the present invention.
Figure 10:
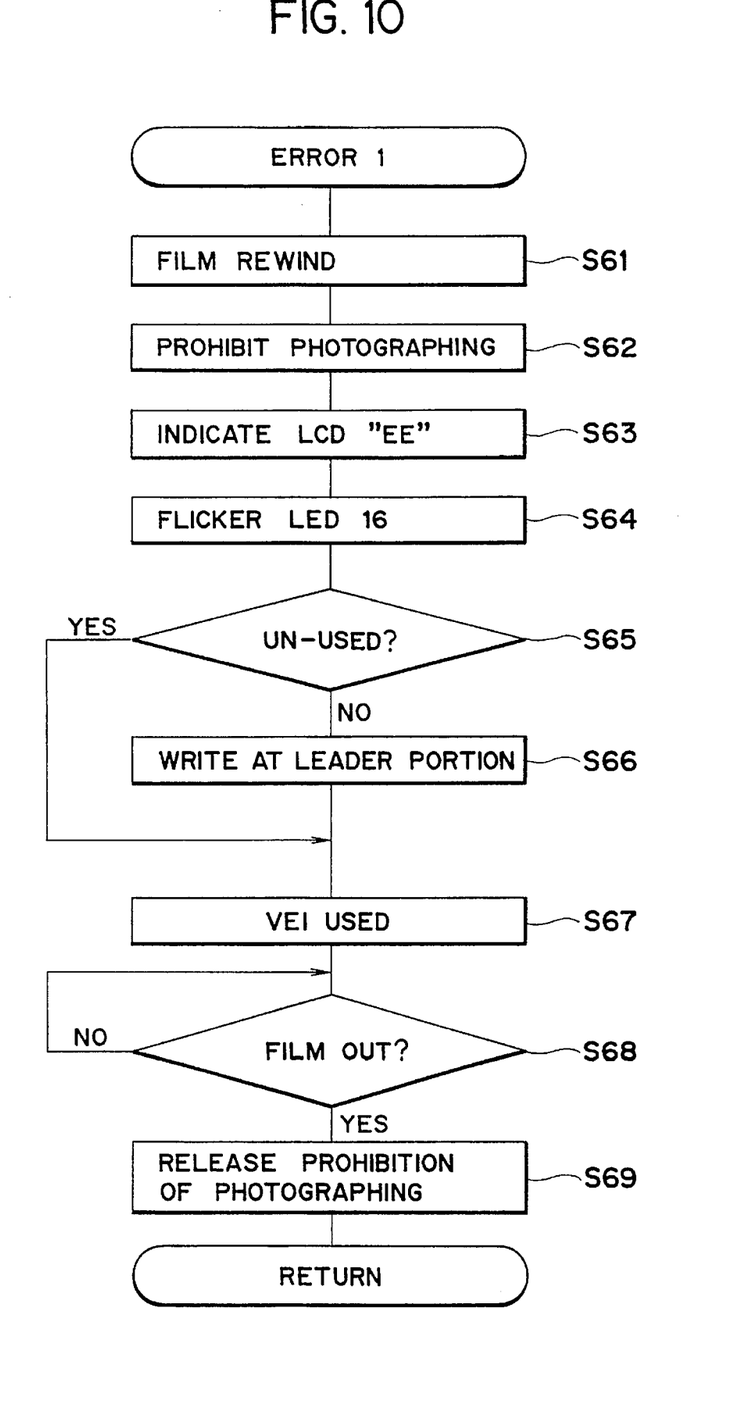
FIG. 10 shows a flow chart of details of an error process 1 in the second embodiment of the camera, of the present invention
Figure 11:
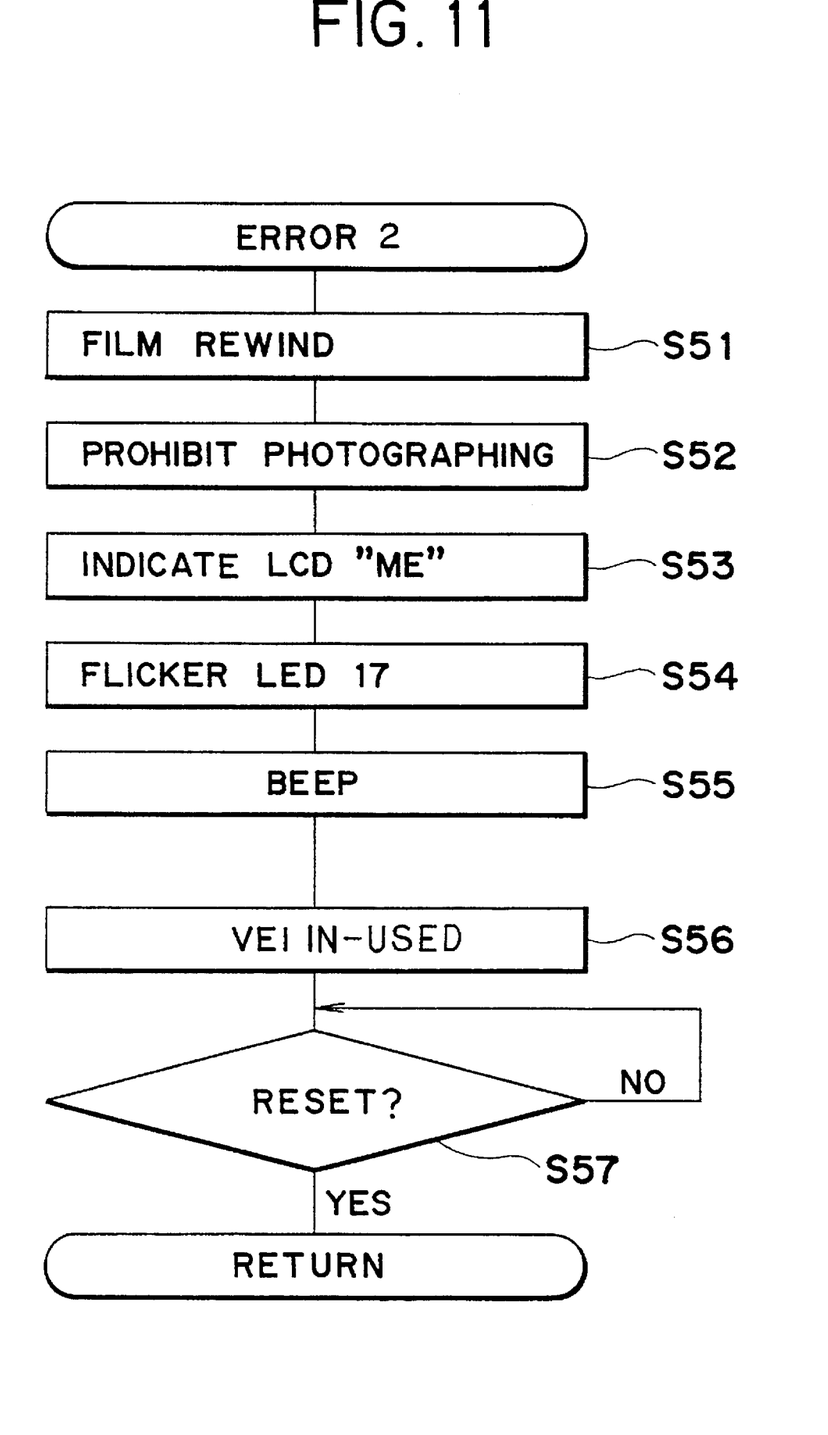
FIG. 11 shows a flow chart of details of an error process 2 in the second embodiment of the camera of the present invention.

FIGS. 9 to 11 illustrate the second embodiment.

A configuration of FIG. 9 is first explained. Like elements to those shown in the first embodiment are designated by like numerals and explanation thereof is omitted.

Numeral 8 denotes a CPU for driving and controlling the overall system. Power therefor is supplied from a battery 7. In addition to the battery 7, connected to the CPU 8 are a release switch 9 which is turned on when the photographing operation is to be started, a feed circuit 10 for taking up and rewinding a film F, a pulse detector 11 for converting a signal detected by a feeding photo-reflector 1 to a signal acceptable by the CPU 8, a magnetic information write circuit 12 for sending a signal for recording photographing information onto a track T of the film F by a magnetic head 5, a magnetic read circuit for reading the magnetic information written in the track T of the film F, an AE/AF/SH circuit 14 for effecting auto-exposure, auto-focusing and shutter release, an LCD (liquid crystal display) 15 for displaying a frame number of the film F and making error warning, LED's (light emitting diodes) 16 and 17 for flashing to make an error warning and a buzzer 18 for generating a sound for error warning. Further, a detector 20 is connected to the CPU 8, and a photo-reflector 19 is connected to the detector 20.

An operation of the second embodiment is now explained only for the differences from that of the first embodiment, with reference to FIGS. 10 and 11.

FIGS. 10 and 11 show flow charts of details of the error processes 1 and 2 in the second embodiment.

The error process 1 is first explained. The film is rewound so that it is not exposed (S61), and then the photographing inhibit state is set not to accept the output from the switch 9 (S62). Then, the LCD display indicating a film error (for example, FE) is displayed (S63) and the LED 16 is flashed (S64). Whether the process corresponds to the error process of the step S12 (see FIG. 3) or the error process of the step S22 (see FIG. 4) is determined (S46). If it is the error process of step S12, the information indicating the "in-use" is recorded in the film leader area (S66). If it is the error process of step S22, the information is not recorded in the film leader area and the process proceeds to the next step. Then, the film use status indication E is changed to "used" (S67), the load/unload of the film is detected by the position of the film load/unload switch (S68), and if the film has been unloaded, the photographing inhibit state set in the step S62 is released (S69).

The error process 2 shown in FIG. 11 is now explained. As in the error process 1, the film F is rewound (S51), and the photographing inhibit state is set (S52). Then, the LCD display indicating an error in the magnetic circuit (for example, ME) is displayed (S53), the LED 17 is flashed (S54) and an alarm sound is generated by the buzzer 18 (S55). Then, the film use status indication E is changed to "in-use" (S56), and when the removal of the power battery 7 is detected, the system is reset (S57).

In the second embodiment, when the magnetic information cannot be read, the film use status indication E is forcibly changed to the position "exposed". Accordingly, the double exposure is prevented and if an unexposed frame is included, a development laboratory may skip that frame when it processes the film so that work efficiency in the development laboratory is improved.

What is claimed is:

1. A camera using a cartridge in which a film having a magnetic recording portion in each frame is loaded, the cartridge having an indication portion that indicates an exposure state of the film in the cartridge, said camera comprising:

indication state detection means for detecting an indication state from the indication portion of the film cartridge;

read means for reading information recorded in the magnetic recording portion in each frame of the film; and determination means for (i) determining whether a frame of the film is exposed or not on the basis of the information read by said read means, (ii) determining the exposure state of the film and (iii) detecting an inconsistency between an exposure state of the film indicated by the indication portion detected by said indication state detection means and an exposure state of the film being determined.

2. A camera according to claim 1, further comprising alarm means for setting off an alarm when said determination means determines that the exposure state is inconsistent.

3. A camera according to claim 1, further comprising inhibiting means for inhibiting a normal sequence action when said determination means determines that the exposure state is inconsistent.

4. A camera according to claim 1, further comprising indication state changing means for changing the indication portion of the cartridge into an indication state indicating that all the film frames have been exposed when the determination means determines that the exposure state is inconsistent.

5. A camera according to claim 1, wherein said determination means determines the exposure state of the film by determining whether a frame is exposed or not on the basis of the information read by said read means when the exposure state of the film detected by said indication state detection means indicates that a portion of the film frames has been exposed.

6. A camera using a cartridge in which a film having a magnetic recording portion in each frame is loaded, the cartridge having an indication portion that indicates an exposure state of the film in the cartridge, said camera comprising:

indication state detection means for detecting an indication state from the indication portion of the cartridge;

read means for reading information recorded in the magnetic recording portion in each frame;

first determination means for determining whether each frame is exposed or not on the basis of the information read by said read means;

second determination means for determining whether all the frames have been exposed or not on the basis of a determination result of each frame by said first determination means; and third determination means for determining operation as being improper when the indication state detected by said indication state detection means indicates that a portion of the frames of the film have been exposed and said second determination means determines that all the frames either have or have not been exposed.

7. A camera using a cartridge in which a film having a magnetic recording portion in each frame is loaded, the cartridge having an indication portion that indicates an exposure state of the film in the cartridge, said camera comprising:

indication state detection means for detecting an indication state from the indication portion of the cartridge;

read means for reading magnetic information recorded in the magnetic recording portion in each frame;

first determination means for determining whether the magnetic information, which is read by said read means, can be read as data;

second determination means for determining whether the indication state detected by said indication state detection means indicates that a portion of the film frames have been exposed; and processing means for performing error processing when said first determination means determines that the magnetic information has not been read as data and when said second determination means determines that a portion of the film frames have been exposed.

8. A camera using a cartridge in which a film having a magnetic recording portion in each frame is loaded, the cartridge having an indication portion that indicates an exposure state of the film in the cartridge, said camera comprising:

indication state detection means for detecting an indication state from the indication portion of the film cartridge;

read means for reading information recorded in the magnetic recording portion of a frame; and determination means for determining the exposure state of the film by determining whether a frame of the film is exposed or not on the basis of the information read by said read means and for detecting an inconsistency between an exposure state of the film indicated by the indication portion detected by said indication state detection means and an exposure state of the film being determined.

9. A camera using a cartridge in which a film having a magnetic recording portion in each frame is loaded, the cartridge having an indication portion that indicates an exposure state of the film in the cartridge, said camera comprising:

indication state detection means for detecting an indication state from the indication portion of the film cartridge;

read means for reading information recorded in the magnetic recording portion of a frame;

first determination means for determining whether a frame of the film is exposed or not on the basis of the information read by said read means; and second determination means for determining whether a photo-taking operation is permitted or inhibited on the basis of the exposure state of the film determined by said first determination means when said indication state detection means detects that the indication portion of the film cartridge indicates that a portion of the film frames has been exposed.

10. A camera using a cartridge in which a film having a magnetic recording portion in each frame is loaded, the cartridge having an indication portion that indicates an exposure state of the film in the cartridge, said camera comprising:

indication state detection means for detecting an indication state from the indication portion of the film cartridge;

read means for reading information recorded in the magnetic recording portion of a frame;

determination means for determining whether a portion of the film frames has been exposed by determining whether a frame of the film is exposed or not on the basis of the information read by said read means; and a control circuit for, when said indication state detection means detects that the indication portion of the cartridge indicates that a portion of the film frames has been exposed, causing an operation of the camera at a time when said determination means determines that a portion of the film frames have been exposed, to be different from an operation of the camera at a time when said determination means determines that the portion of the film frames has not been exposed.

11. A camera according to claim 10, wherein said control circuit inhibits a photo-taking operation when said determination means determines that a portion of the film frames has not been exposed.

12. A camera using a cartridge in which a film having a magnetic recording portion in each frame is loaded, the cartridge having an indication portion that indicates an exposure state of the film in the cartridge, said camera comprising:

indication state detection means for detecting an indication state from the indication portion of the film cartridge;

read means for reading information recorded in the magnetic recording portion of a frame;

determination means for determining whether the frames have been exposed on the basis of the information read by said read means; and a decision circuit for deciding an exposure state of the film on the basis of the result of the determination of said determination means when said indication state detection means detects that the indication portion indicates that a portion of the film frames has been exposed, and for immediately deciding that all the frames have not been exposed when said indication state detection means detects that the indication portion indicates that all the frames have not been exposed.

* * * * *